Feb. 20, 1934.   F. S. KINGSTON   1,948,037
ELECTRIC MOTOR
Filed Oct. 25, 1928

Inventor

F. S. KINGSTON

By Fisher, Moser & Moore
Attorney

Patented Feb. 20, 1934

1,948,037

UNITED STATES PATENT OFFICE 1,948,037

ELECTRIC MOTOR

Frederick S. Kingston, Warren, Ohio, assignor, by mesne assignments, to Sunlight Electrical Company, Warren, Ohio, a corporation of Ohio Application October 25, 1928, Serial No. 314,948, and in Canada October 26, 1927

8 Claims. (Cl. 172—279)

My invention relates to an improvement in electric motors, and the present application is a continuation in part of my copending application for patent for an induction motor, Serial No. 198,093, filed June 11, 1927 that has matured into Patent No. 1,853,864. Thus the present improvement involves an electric motor in which an electrically-controlled clutch is utilized to permit starting of the rotor independently of the load and to pick up the load with increased torque when up to speed. The present motor also embodies means to automatically change the reactance of the main winding or density of the field coincidently with the disengaging and engaging movements of the clutch, so that starting may be effected with a minimum amount of current. For example, the main winding may be subdivided, and a centrifugal switch and an automatic switch or relay arranged to coact to effect the desired change in reactance in starting and running operations, all as hereinafter shown and described and more concisely pointed out in the claims.

Figure 1:
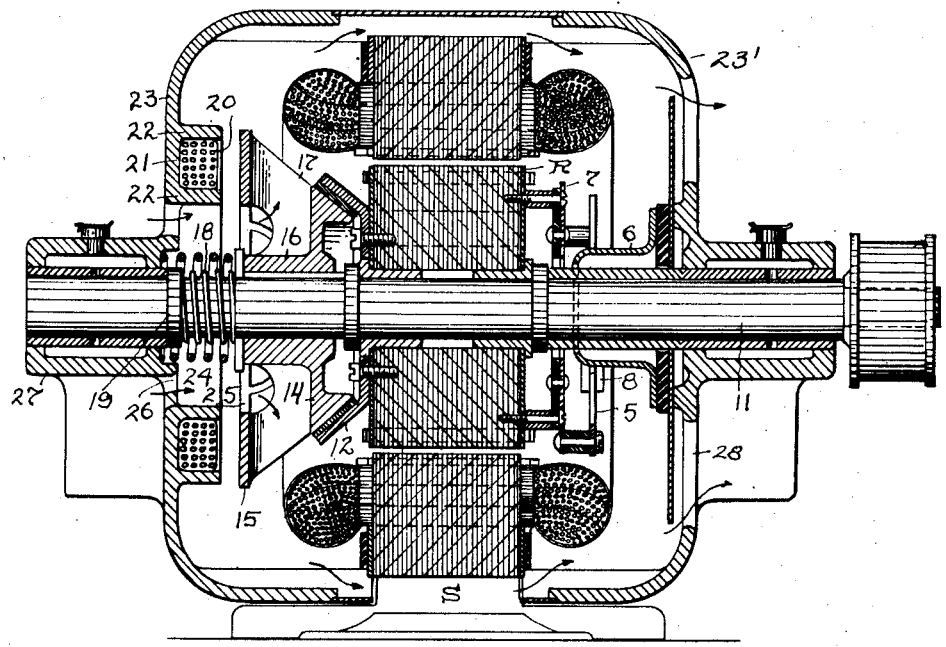
Figure 2:
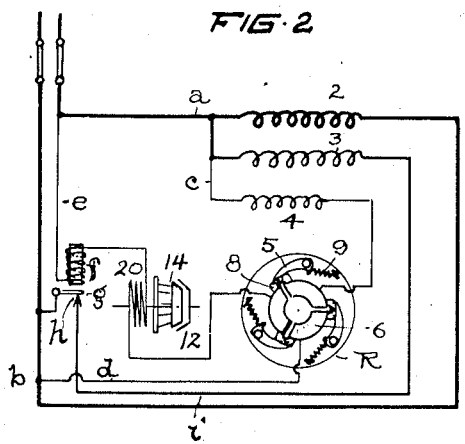
Figure 3:
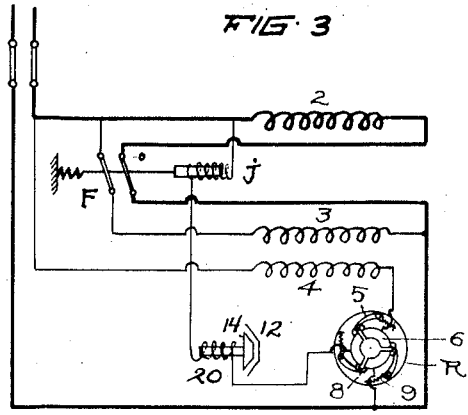

In the accompanying drawing, Fig. 1 is a sectional view of a motor embodying my improvement, Fig. 2 is a diagram of one motor circuit embodying my improvement, and Fig. 3 is a diagram of a modification.

The motor comprises a stator S having a main winding divided into two or more parts or coils 2 and 3, respectively, which coils may be used jointly for running purposes, and one or more cut out or switched to change the density of the field for an interval in starting operations. A separate starting winding 4 is connected across the line, and a centrifugal switch used to cut out this winding when the motor is up to speed. The centrifugal switch includes a set of centrifugal switch elements 5, and a three-part or triplex switch cup 6 stationed at one side of rotor R. The switch elements 5 are pivotally mounted at spaced intervals radially of a disk or ring 7, and each element carries a terminal member 8 adapted to contact with cup 6 under the tension of a spring 9 until the rotor reaches a predetermined speed.

Rotor R is free to revolve on motor shaft 11 and carries a dished clutch member 12 at one side thereof. A sliding cone or beveled clutch member 14 is keyed slidably to shaft 11 and faced with leather or other friction material to coact with the dished member 12 in driving the shaft when the motor is running under load. A flat ring or plate 15 is affixed to or forms an integral part of clutch member 14, being preferably spaced apart from hub 16 and also the friction head thereon but connected therewith by radial ribs 17 which serve as fan blades when shaft 11 is in motion. A coiled spring 18 is sleeved loosely on shaft 11 between a fixed collar 19 and hub 16, thereby maintaining frictional engagement between the respective clutch members at all times except in starting. In that interval spring 18 is compressed and cone member 14 is disengaged from member 12 by electro-magnetic pull on plate 15 which is spaced apart from a magnet coil 20 confined within an annular channel 21 formed by a pair of concentric ribs 22 extending inwardly from the end wall of hood 23 of the motor. A circular space 24 surrounds shaft 11 opposite a corresponding opening 25 between hub 16 and the inner edge of the ring-shaped plate or armature 15, thereby forming an annular air intake passage for the fan blades 17. Hood 23 contains air inlet openings 26 around the bearing 27 which communicate with space 24, and the other end hood 23' of the motor is also provided with openings 28 to promote circulation of the air through the motor.

The electric circuit for the motor shown diagrammatically in Fig. 2, includes a main winding having two divisions or sets of coils 2 and 3, connected in parallel across the supply line. The starting winding 4 is connected to side $a$ of the line and to one segment of switch cup 6 by a conductor $c$, and to the other side $b$ of the line and a second segment of the cup by a conductor $d$. The third segment of cup 6 is connected to side $a$ of the line by a circuit $e$ which includes the coil or winding 20 of the electro-magnet for the clutch and the coil or winding of a relay or switch $f$. As shown, the armature $g$ of relay $f$ provides a make and break $h$ in the connection $i$ leading from side $b$ of the line to the divided part or coil 3 of the main winding for the motor, thereby permitting this part of the main winding to be cut out for an interval during starting operation with a corresponding saving or decrease of current in starting. Thus in operation, when the current is first switched on the current is divided, passing through all three coils, 2, 3, and 4, but only for an instant. The current passing through starting winding 4 energizes the clutch winding 20 and also the relay coil $f$, thereby instantly disengaging the clutch members, which permits rotor R to revolve freely on shaft 11, while relay $f$ co-incidently breaks the connection $i$ and cuts out the divisional part 3 of the main running winding to change the density of the field and decrease or lessen the amount of current in starting while rotor R revolves freely on the shaft independently of the load. Any suitable switching device may be used in lieu of relay *f*, which is a diagrammatic representation only. When the rotor reaches its operating speed the starting winding is quickly cut out by the centrifugal switch elements 5, thereby deenergizing magnet coil 20 and relay coil *f* co-incidently. As this occurs the clutch members are brought into slip clutching engagement, and starting of drive shaft 11 accomplished at full operating speed. Both divisions 2 and 3 of the main running winding are also placed in circuit when clutching is effected at full operating speed, inasmuch as relay *f* is de-energized co-incidently with magnet coil 20 and effects the closing of circuit *d* by release of armature *g*. As a result, only a small amount of electric current is required to start the motor, and heavy drain and objectionable fluctuations of current on the line is eliminated.

The motor circuit shown in Fig. 3 also shows a main winding divided into two running coils 2 and 3, but in lieu of using a relay to cut out one of the coils to effect starting with a low inrush of current, I provide a suitable relay or automatic switch F adapted to switch the two coils in series in starting and then, when the starting winding is cut off, to switch the two coils in parallel. As an exemplification, a double pole switch F may be operatively connected to an electromagnet having a winding *j* connected across the line in series with the clutch winding 20 and the centrifugal switch cup 6, whereby when the current is switched on to start the motor the clutch will be disconnected to permit the rotor to revolve freely on the shaft, and the double pole switch will be shifted to place the two running coils in series with a low inrush of current. When the rotor comes up to speed the centrifugal switch will de-energize the clutch and switch coils, and the operating springs for said devices will restore them to their original positions, thereby switching the two divisions or coils 2 and 3 of the main winding in parallel at the instant the clutch picks up the load at the highest speed and maximum torque of rotor R.

The two diagrams, Figs. 1 and 2, thus exemplify different arrangements for accomplishing the same or similar results, that of automatically changing the reactance or density of the field so that less current will be drawn from the line or source when the clutch is disengaged and the rotor is free to revolve independently of the load. When the rotor comes up to speed under these conditions the centrifugal switch acts to de-energize the clutch winding, and the divided parts of the field windings are connected in multiple to supply the motor with sufficient current to take care of the load for which it is designed.

What I claim, is:

1. A split-phase electric motor, comprising a divided main winding, a starting winding, an electro-magnetic clutch in circuit with said starting winding, adapted to be released in starting operations, and a relay in said starting circuit adapted to cut out a part of said main winding co-incidently with the release of said clutch.

2. A split-phase electric motor, comprising a divided main winding connected across the line in parallel, a starting winding, automatic switch means adapted to cut out said starting winding when the motor gets up to speed, an electro-magnetic clutch in circuit with said starting winding adapted to be released in starting the motor, and a relay in circuit with said starting winding adapted to cut out a division of the main winding in the starting operations.

3. A split-phase electric motor, comprising a divided main winding and a starting winding connected in parallel across the line, a triplex switch cup and automatic switching means in circuit with the starting winding, an electro-magnetic clutch and a relay in circuit with the starting winding, said relay controlling one of the divisions of said main winding and said triplex switch cup being connected with the starting winding, the electromagnetic clutch and a conductor connected to the line.

4. In combination, a dynamo-electric machine having a field winding sub-divided in several sections, a starting winding, a rotor and shaft, a normally-engaged clutch for said rotor and shaft, a starting circuit which includes said starting winding and a centrifugal switch for breaking said circuit when the rotor is up to speed, a clutch circuit, an electro-magnetic winding within said clutch circuit for throwing out said clutch, and means for automatically changing the cooperation of the sections of said field winding to change the reactance of said field winding co-incidently with the disengaging and engaging movements of said clutch.

5. In combination, a source of alternating current, a split-phase induction motor, including a main field winding sub-divided in several sections a rotor and shaft, means for automatically disconnecting the rotor from the shaft in starting, means for automatically changing the connections for the main field winding with said source to reduce the inrush of current in starting, and means for operating said latter means co-incidently with said first means.

6. In combination, a source of alternating current, a split-phase induction motor, including a main field winding sub-divided in several sections connected to said source, a rotor and shaft means for disconnecting the rotor automatically from the shaft in starting, and means controlled by said first means for automatically reducing the inrush of current from said source during the free running of the rotor.

7. A split phase electric motor, comprising a divided main winding, a starting winding, a normally engaged clutch, an electro-magnet to release said clutch in starting operations and means coincidentally operated with the release of said clutch adapted to control the inrush current in said main winding.

8. A split phase electric motor comprising a rotor, a shaft, a triplex switch cup and centrifugal switching element, a main winding, a starting winding connected with one of the segments of said cup, a conductor connected with the second cup segment and to the line, and an electromagnetic clutch for connecting the rotor and shaft whose winding is connected with the third segment cup adapted to be released in starting operations to reduce the inrush of current during starting operations of the motor.

FREDERICK S. KINGSTON.